United States Patent [19]

Geerts et al.

[11] Patent Number: 4,709,260

[45] Date of Patent: Nov. 24, 1987

[54] COLOR TELEVISION CAMERA WITH TEST IMAGE PROJECTOR AND PRECOMPENSATION MEANS FOR CORRECTING FOR IMAGING ERRORS CAUSED BY OBLIQUE ANGLES OF INCIDENCE OF TEST IMAGES ON PICKUP ELEMENTS

[75] Inventors: Wilhelmus H. M. Geerts; Filippus L. Stok; Engbert Tienkamp, all of Breda, Netherlands

[73] Assignee: U.S. Philips Corporation, New York, N.Y.

[21] Appl. No.: 721,971

[22] Filed: Apr. 11, 1985

[30] Foreign Application Priority Data

Apr. 24, 1984 [NL] Netherlands .......................... 8401309

[51] Int. Cl.$^4$ ..................... H04N 9/093; H04N 5/225; H04N 9/097; H04N 17/02
[52] U.S. Cl. ....................................... 358/51; 358/10; 358/55; 358/139; 358/225
[58] Field of Search ................. 358/225, 226, 55, 139, 358/50, 51, 10, 41, 43, 44, 52, 217

[56] References Cited

U.S. PATENT DOCUMENTS

| | | | |
|---|---|---|---|
| 3,610,818 | 10/1971 | Bachmann | 358/55 |
| 3,718,752 | 2/1973 | Katsuta et al. | 358/55 |
| 3,987,482 | 10/1976 | Robers | 358/51 |
| 4,080,623 | 3/1978 | Needs | 358/55 |
| 4,084,179 | 4/1978 | Sekiguchi | 358/55 |
| 4,270,140 | 5/1981 | Ohishi | 358/55 |
| 4,285,004 | 8/1981 | Morrison et al. | 358/51 |
| 4,308,551 | 12/1981 | Ohnuma et al. | 358/55 |
| 4,384,769 | 5/1983 | Brei et al. | 358/10 |
| 4,455,569 | 6/1984 | Takahashi et al. | 358/51 |
| 4,513,319 | 4/1985 | Breimer et al. | 358/163 |

FOREIGN PATENT DOCUMENTS 1577746 6/1969 France .

OTHER PUBLICATIONS

Kaspar, Joseph, "A Painless Slide into Accuracy", *Broadcast Engineering*, Apr. 1976, pp. 32, 34-35.

*Primary Examiner*—James J. Groody
*Assistant Examiner*—Randall S. Svihla
*Attorney, Agent, or Firm*—Marc D. Schechter

[57] ABSTRACT

A color television camera has an optical color separation system provided in an optical path for scene light so as to produce pictures of different colors on pickup areas of pickup elements. The scene light extends along optical axes in the system which are central axes of the pickup areas. To synchronize picture signals so that picture coverage is optimized on the joint display thereof, the camera comprises a test image projector and an adjusting circuit. So as to obtain a compact optical system without using a movable reflecting surface for the test image, which surface would be moved in and out of the optical path, the light of the test image is projected at an oblique angle with respect to the optical axes into the color separation system and strikes the pickup areas at an oblique angle. Optical imaging errors produced thereby are precompensated. Optical precompensation means are provided in the form of an obliquely arranged test image slide and a cylindrical plano-convex correction lens. Electrical precompensation means include potentiometers or other adjustable memory circuits.

17 Claims, 4 Drawing Figures

COLOR TELEVISION CAMERA WITH TEST IMAGE PROJECTOR AND PRECOMPENSATION MEANS FOR CORRECTING FOR IMAGING ERRORS CAUSED BY OBLIQUE ANGLES OF INCIDENCE OF TEST IMAGES ON PICKUP ELEMENTS

BACKGROUND OF THE INVENTION

The invention relates to a color television camera comprising a plurality of pickup elements. Each pickup element converts an optical image on a pickup area of the pickup element into an electric picture signal. The optical images are obtained by an optical color separation system provided in an optical path of scene light.

The camera comprises a test image projector for producing a test image on the pickup areas via the optical color separation system. The camera comprises an adjusting circuit coupled to the pickup elements for obtaining, with the aid of the test images, synchronous picture signals with optimum picture coverage on joint display.

Such a color television camera is disclosed in French Pat. No. 1,577,746. More specifically, FIG. 3 of that patent shows the color separation system and the test image projector. Herein, a wheel, provided with a transparent optical filter plane and an opaque plane which has a reflecting surface on the side facing the color separation system, is arranged in front of a light entrance face of the color separation system.

During scene recording, the transparent filter plane of the wheel is present in the optical path to the color separation system. During synchronization of the picture signals (that is to say that upon a collective display of the adjusted picture signals to obtain optimum registration), the opaque plane of the wheel is present as a shutter in the optical path, thus blocking light coming from the scene. The test image is then projected to the reflecting wheel plane, which reflects the light from the test image in the direction of the optical axis to the light entrance face of the color separation system. As a result, the test images and the scene pictures are produced on the pickup areas of the pickup elements along the same optical axes. In the drawing the wheel is provided between an optical lens system and the optical color separation system.

Arranging the reflecting shutter between the optical lens system and the optical color separation system is considered to be a disadvantage, as it is desirable to keep the optical path as short as possible. When the optical path is kept as short as possible, a more compact construction is obtained so that less imaging errors occur in the optical path.

Advantageously, the shutter is arranged before the optical lens system, but the presence of the wheel then interferes with adjustment of the lens system. So as to enable an unobstructed rotation of the wheel between the lens system and the color separation system, prior to and after adjustment of the lens system, some mechanical tolerance is necessary, which again increases the length of the optical path.

SUMMARY OF THE INVENTION

It is an object of the invention to provide a color television system having a minimum optical path in the optical lens and color separation system, but without requiring additional mechanically movable elements for adjusting the lens system.

According to the invention, in a color television camera the light coming from the test image projector is incident on the color separation system at an oblique angle with respect to the optical axes of the system, and consequently strikes the pickup areas at an oblique angle with respect to the optical axes of the scene light. The camera comprises for the purpose of obtaining optimum synchronization between the picture signals, precompensation means for correcting imaging errors caused by the oblique angle of incidence of the light on the pickup areas of the pickup elements.

Because of the fact that the light from the test image is incident at an oblique angle with respect to the optical axis associated with the scene light, there is no need to move the filter wheel to place the light-reflecting plane in the optical path of the scene light. The optical imaging errors caused by the oblique angle of incidence are optically and/or electrically recompensated for with the aid of the precompensation means.

This precompensation must be adjusted once by the camera producer. It may also be necessary to repeat this adjustment when, for example, a pickup element is replaced by another element. After the precompensation has been adjusted, the adjusting circuit for synchronizing the picture signals is operative in known manner.

In an embodiment of a color television camera according to the invention in which the optical system is more compact, the television camera contains, outside the optical path for the scene light, a light-reflecting plane to which the test image projector is directed. The light reflected from the test image is incident in the color separation system at an oblique angle relative to the optical axes.

An optical precompensation for the imaging errors at the pickup areas of the pickup elements is obtained in an embodiment of the camera according to the invention by arranging the test image slide at an oblique angle with respect to the optical axis of a light beam in the projector.

A different optical precompensation is obtained in an embodiment in which the test image projector comprises a cylindrical plano-convex correction lens as a precompensation means.

In an embodiment of a camera according to the invention comprising an electrical precompensation, the adjusting circuit for synchronizing the picture signals comprises memory circuits as precompensation means.

In a further embodiment, a memory circuit for scan adjustment is provided at an input of a circuit for the electronic scanning of the pick-up area of a pickup element.

In a still further embodiment, a memory circuit comprises an adjustable constant-d.c. voltage potentiometer.

A simple feature for adjusting the precompensation at the adjusting circuit allows the precompensation means provided at the adjusting circuit to be switched off.

DESCRIPTION OF THE PREFERRED EMBODIMENTS

Figure 1:
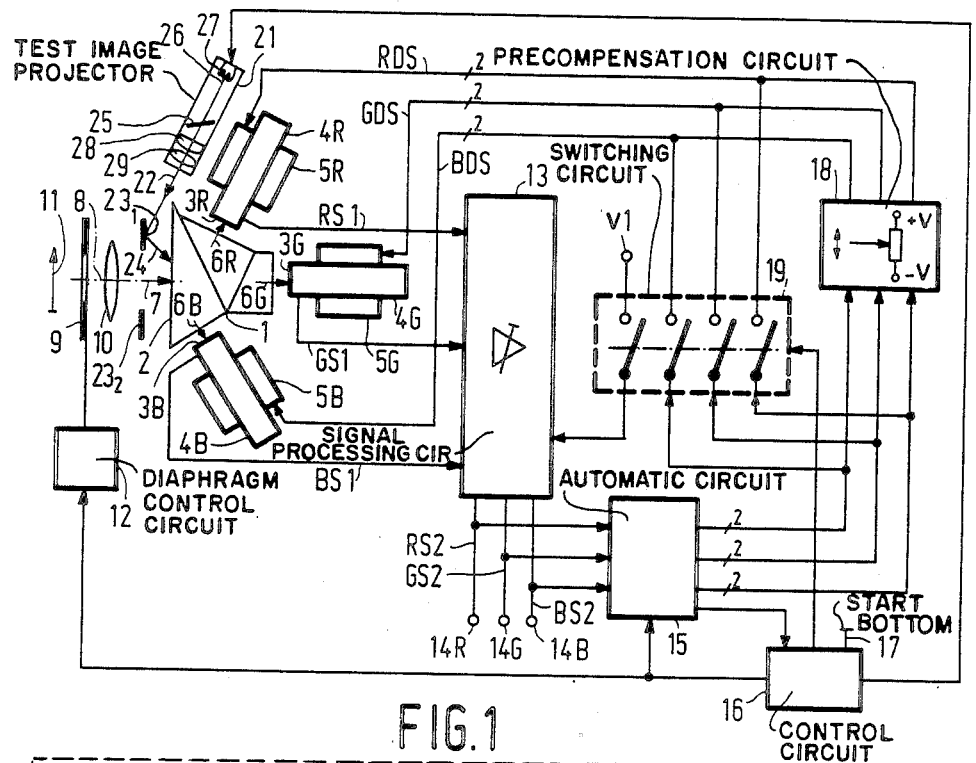
FIG. 1 is a block schematic circuit diagram of an embodiment of a color television camera according to the invention.

In the block schematic circuit diagram shown in FIG. 1 of an embodiment of a color television camera according to the invention, only those components are shown which are relevant to the explanation of the invention.

Reference numeral 1 denotes a color separation system which is formed in known manner by, for example, prisms. The system 1 has a light entrance face 2 and three light exit faces to which pickup areas 3R, 3G and 3B, respectively, of the respective pickup elements 4R, 4G and 4B are contiguous.

Provided at the pickup elements 4R, 4G and 4B are electronic scanning means denoted by 5R, 5G and 5B, respectively. With the aid of the scanning means optical images on pickup areas 3R, 3G and 3B are converted into electric picture signals RS1, GS1 and BS1, respectively.

The specific constructions of the pickup elements 4 and of the scanning means 5 are only important to the invention insofar that they determine only the measures by which synchronism of the picture signals RS1, GS1 and BS1 is obtained. When there is optimum synchronism, subpictures which are optimally registered are obtained when the picture signals RS1, GS1 and BS1 are displayed together.

When the pickup elements 4 are pickup tubes with electron beam scanning of the pick-up areas 3, the scanning means 5 are electron beam deflection means. Currents and voltages for the line and field deflections are shifted to synchronize the picture signals.

When the pickup elements 4 are solid state pickup devices, the scanning means 5 comprise one or more clock pulse sources to control the scan. When scanning is effected by a matrix system and line and field shift registers connected thereto, the picture signal can be synchronized by operating the shift registers locally varied across the picture (that is to say the shift registers which start operation simultaneously begin in difference places). When charge transfer devices are used, the information components are serially shifted through rows of pick-up elements, and the places where the line and field scanning start can also be locally varied.

In addition, the line scan can be synchronized by means of a variable delay device. For simplicity in describing the invention, which will become apparent from the description of FIG. 2, the description is based on pickup elements 4 in the form of pickup tubes. Then, the scanning means 5R, 5G and 5B each have two inputs to which a line and field scan shift current or voltage RDS, GDS and BDS, respectively are applied.

At the pickup areas 3R, 3G and 3B, optical axes 6R, 6G and 6B are designated by arrows. The axes are assumed to be the center axes of the scene light beams directed to the centers of the images.

A corresponding optical axis at the entrance face 2 is denoted by 7. The optical axis 7 is the center axis of an optical path 8 for scene light. Diaphragm 9, a lens system 10, and the color separation system 1 are arranged in optical path 8.

Reference numeral 11 in FIG. 1 designates an arrow which on the one hand represents a scene to be recorded and to be displayed or on the other hand a test plate which is provided for the purpose of adjusting the camera. The diaphragm 9 is controlled by a control circuit 12.

The picture signals RS1, GS1 and BS1 are applied to a signal processing circuit 13 which, as is shown, comprises variable-gain and controllable amplifier circuits. The signal processing operations effected in circuit 13 are not further described.

It is shown that the circuit 13 supplies three signals RS2, GS2 and BS2, which are derived from the respective signals RS1, GS1 and BS1. The signals RS2, GS2 and BS2 become available at terminal 14R, 14G and 14B for further signal processing operations in the camera shown in FIG. 1 and for application to and display on picture display devices. In addition, the signals RS2, GS2 and BS2 are applied, according to FIG. 1, to an adjusting circuit for synchronizing the picture signal.

The adjusting circuit comprises an automatic circuit 15 (AUT), a control circuit 16 having a start button 17, a precompensation circuit 18 and a switching circuit 19. In the adjusting circuit (15–19) thus formed, the control circuit 16 not only controls the automatic circuit 15 and the switching circuit 19, but also the diaphragm control circuit 12. The control circuit 16 further applies a supply voltage to a test image projector 21.

The automatic circuit 15 is shown to have three pairs of outputs which are coupled to a like number of inputs of the scanning means 5R, 5G and 5B via the precompensation circuit 18 and the switching control circuit 19. Switching circuit 19 is provided, inter alia, as a means for short-circuiting precompensation circuit 18.

As can be seen from the drawing, the automatic circuit 15 has an output which is connected to an input of the control circuit 16 and through which control circuit 16 is signalled that the adjusting procedure has been completed.

Alternatively, the circuit 15 is always operative for the same period of time, which period is of such a duration that optimum adjustment is obtained therein without fail.

The switching circuit 19 is further used to apply a constant d.c. voltage V1 to the signal processing circuit 13 during the automatic operation of the adjusting circuit (15–19). In the circuit 13 the voltage V1 is operative as a gain setting voltage.

If the test image projector 21 and the precompensation circuit 18 were absent, the arrow 11 then representing a test plate, the color television camera of FIG. 1 can be adjusted with the aid of the automatic circuit 15 in the manner described in U.S. Pat. No. 3,987,482. The switching circuit 19 is then in the switched-on state and the diaphragm 9 is open.

Such an adjustment, which must be regularly repeated, using an external test plate (11) arranged in front of the camera has, generally, the disadvantages described in European Patent Application No. 84,195. European Patent application No. 84,195 describes, by way of a solution, the use of an internal test image projector for recurrent adjustments, and the use of what is referred to as a lens memory which is filled nonrecurrently with lens correction information using the external test plate. This solution is equally suitable for use in the adjusting procedure described in French Pat. No. 1,577,746 if the internal test image is projected between the lens system and the color separation system by means of a mirror.

According to one aspect of the invention, the adjusting circuit (15-19) comprises the precompensation circuit 18 which precompensates optical imaging errors on the pickup areas 3 of the pickup elements 4. These optical imaging errors are caused by the manner in which the test image projector 21 produces test images on the respective pickup areas 3R, 3G and 3B.

In FIG. 1, reference numeral 22 denotes the optical axis of the light from the test image produced by the test image projector 21. In the television camera a light-reflecting plane $23_1$ is arranged outside the optical path 8. The light from the test image projector 21 is directed to that plane. FIG. 1 shows that the optical axis 24 of the reflected test image at the light entrance face 2 of the system 1 is at an oblique angle relative to the optical axis 7 of the system 1. The optical axes 6R, 6G and 6B of the respective pickup areas 3R, 3G and 3B are associated with the optical axis 7, so that the light from the test image is incident on these pickup areas at the same oblique angle. This produces optical imaging errors on the pickup areas 3R, 3G and 3B.

Figure 3A:
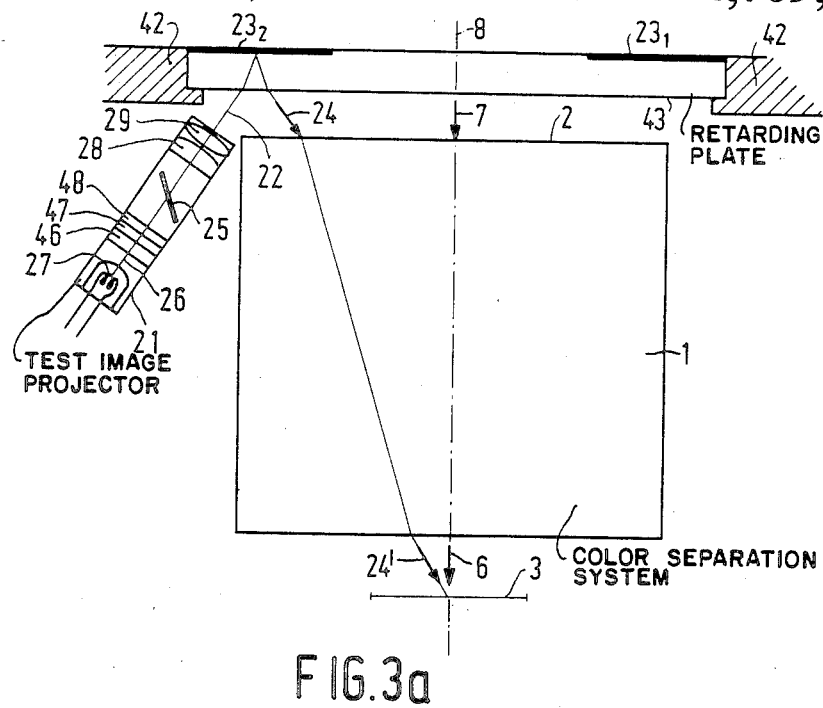
FIGS. 3a and 3b show in greater detail a test image projector with optical precompensation means and projection into the optical system.

In FIG. 1, the test image projector 21 is directed to the reflecting plane $23_1$ but it might alternatively be directed, as shown in FIG. 3a, with the same results to a light reflecting plane $23_2$ located on the other side of the optical path 8. In a manner to be described with reference to FIG. 3b, the planes $23_1$ and $23_2$ are provided for the purpose of additional or bias illumination when the pick-up elements 4 are pickup tubes. Projecting the test image with the aid of one of the planes 23 has, because of the folded character of the light beam, the advantage of a shorter optical path as compared with a direct projection into the color separation system 1.

The imaging errors caused by the oblique angle at which the light is incident on the pickup areas 3 can be optically precompensated for. To illustrate this, FIG. 1 schematically shows in the test image projector 21 two possible precompensation techniques. In the test image projector 21 a slide 25 is arranged, as a first precompensation means, obliquely with respect to an optical axis 26 of a light beam produced in the projector 21 by a projector lamp 27. The direction and degree of the angle of tilt is obtained according to the so-called Scheimpflug condition. As a result of this tilt, the Scheimpflug condition (which specifies that a small object distance relative to a lens requires a large image distance and a large object distance requires a small image distance), is obeyed to a better extent.

The slide 25 is followed, as a second precompensation means, by a cylindrical plano-convex correction lens 28, which is followed by a double convex imaging lens 29. The lenses 28 and 29 may be interchanged, which also holds for the plane and the convex faces of the lens 28. The lens 28 substantially compensates for the astigmatism caused by the oblique position of the slide 25 with respect to the optical axis 26. The astigmatism results in unsharp optical images on the pickup areas 3.

Figure 2:
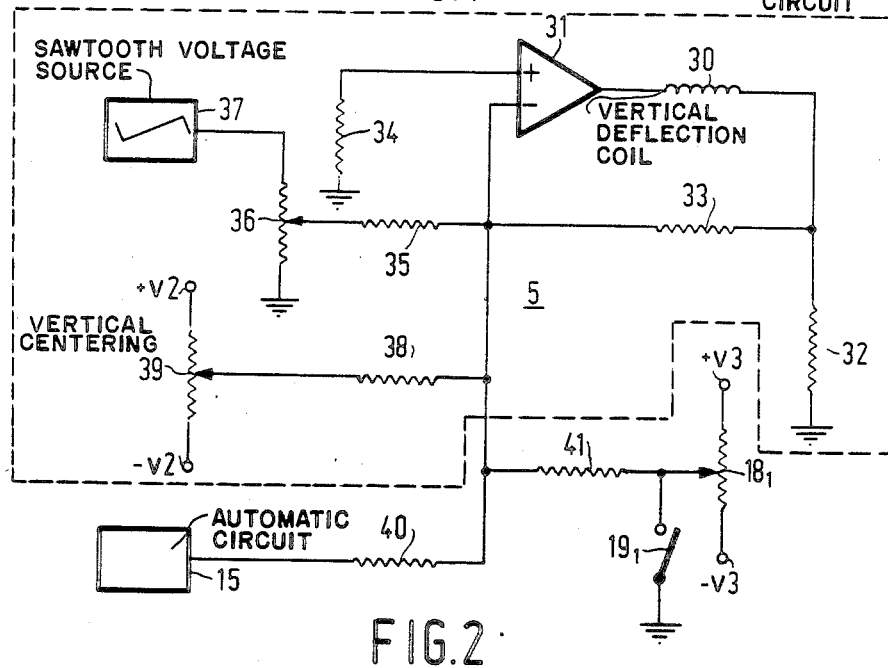
FIG. 2 schematically illustrates in greater detail a portion of an adjusting and scanning circuit of the camera of FIG. 1, comprising a disconnectable precompensation means in the form of a potentiometer used as an adjustable memory circuit.

For the electrical precompensation of the imaging errors caused by the oblique angle of incidence of the light on the pickup areas, FIG. 2 shows a circuit which is suitable for use when the pickup elements 4 are pickup tubes. The scanning means 5 and the automatic circuit 15 already shown and described with reference to FIG. 1 are denoted in FIG. 2 by the same reference numerals.

Reference numeral $18_1$ in FIG. 2 is a precompensation means in the form of a memory circuit, constituted by a potentiometer. An associated switch for switching off the precompensation means is denoted by $19_1$.

Let is be assumed that the circuit of FIG. 2 provides for the field of vertical scanning of a pickup element 4. Reference numeral 30 denotes a deflection coil for an electron beam in a pickup tube. The deflection coil 30 is connected at one end to the output of a differential amplifier 31 and at its other end to ground via a resistor 32. The junction of the coil 30 and the resistor 32 is fed back via a resistor 33 to the ($-$) output of the amplifier 31, whose (+) input is connected to ground via a resistor 34.

Via a resistor 35 the ($-$) input of the amplifier 31 is connected to a tap of a potentiometer 36, which is connected between an output of a sawtooth voltage source 37 and ground. The source 37 applies a sawtooth current through the deflection coil 30 for the electron beam via the feedback amplifier 31.

The ($-$) input of the amplifier 31 is connected via a resistor 38 to a tap of a potentiometer 39, which is connected between terminals carrying constant d.c. voltages $+V2$ and $-V2$. The potentiometer 39 is used for centering purposes for the electron beam deflection by applying an adjustable constant direct current through the deflection coil 30 via the resistor 38.

The ($-$) input of the amplifier 31 is connected to an output of the automatic circuit 15 via a resistor 40 and is further connected to a tap of the potentiometer $18_1$ via a resistor 41. The potentiometer $18_1$ is connected between terminals which carry constant d.c. voltages $+V3$ and $-V3$. The tap of the potentiometer $18_1$ is connected to ground via the switch $19_1$. When the switch $19_1$ is closed, the potentiometer $18_1$ is inoperative. If the switch $19_1$ is open, the potentiometer $18_1$ produces a d.c. voltage shift resulting in a shifted field deflection. The components 30 to 39 of FIG. 2 are assumed to be present in each of the scanning means 5 of FIG. 1.

A possible mode of adjusting the camera shown in FIG. 1 will be described with reference to FIGS. 1 and 2. After the control circuit 16 has been activated by the start button 17, the diaphragm 9 is closed via the control circuit 12, the test image projector 21 is made operative and the switching circuit 19 is closed. All the switches in the switching circuit 19 are closed to short-circuit potentiometers 18 (e.g. $19_1$ of FIG. 2 short-circuits potentiometer $18_1$) or for applying the constant gain setting voltage V1 to the circuit 13. The potentiometer 39 is then readjusted such that the automatic circuit 15 is approximately in the middle of the control range.

Thereafter the automatic circuit 15 becomes operative, as described in U.S. Pat. No. 3,987,482. The circuit 15 provides such a shift current through the deflection coils 30 that the signals RS2, GS2 and BS2 are synchronized.

Subsequently, the automatic circuit 15 and the test image projector 21 are switched off, the diaphragm 9 is opened and the switching circuit 19 is opened. The external test image (arrow 11) is recorded by the camera through the diaphragm 9. The potentiometer $18_1$ is now readjusted, either manually or by an automatic circuit not further shown, so that the signals RS2, GS2 and BS2 are again synchronized. This implies that the camera is in the adjusted state.

The precompensation circuit 18 is, as is mentioned above, adjusted once with the aid of an external test image. The described simple adjustment of the precompensation is provided by the capability of switching off the precompensation means 18 with switching circuit 19. After the precompensation is adjusted, the circuit 15 is operative in a known manner, the test image projector 21 is operative, the diaphragm 9 is closed, and the precompensation circuit 18 is switched on. Readjustment of the precompensation may be necessary, when, for example, a pickup element 4 is replaced.

In FIGS. 1 and 2 the precompensation is obtained by the adjustable potentiometers (18, 18₁) which carry a constant d.c. voltage. The potentiometers act as memory circuits. For a different embodiment of the invention, it is, for example, possible to use a digital memory followed by a digital-to-analog converter, for delivering the d.c. voltage shift for the field deflection. The memory circuit is also then provided for scan adjustment purposes at an input of the scan circuit (30-39) at the pickup area 3 of a pickup element 4.

Figure 3B:
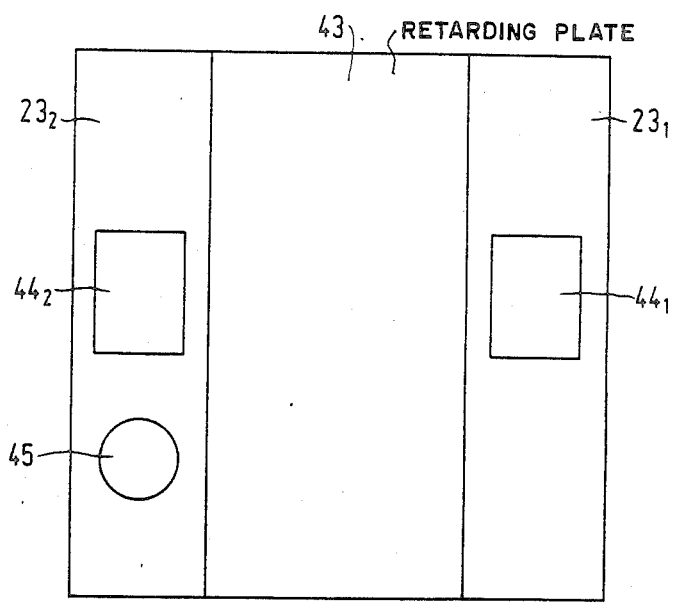

FIG. 3a shows in greater detail an embodiment of the test image projector 21, together with the reflecting planes 23₁ and 23₂. FIG. 3b shows these planes as seen from the color separation system. Components already described in FIG. 1 have the same reference numerals in FIGS. 3a and 3b. The oblique angle of incidence onto the pickup areas 3 is denoted in FIG. 3a by 24'.

A retarding plate 43 is provided in a housing 42. Opaque, light-reflecting planes 23₁ and 23₂ are provided on the transparent plate 43. The plate 43 is, for example, a quartz plate for anti-polarization of transmitted light and for infrared filtration. As a result thereof, quasi-depolarized, visible light is applied to the color separation system 1.

The planes 23₁ and 23₂ are provided primarily to obtain additional illumination of the pickup areas 3, and to filter infrared.

In FIG. 3b, reference numerals 44₁ and 44₂ denote areas via which the additional illumination is obtained by reflection. In accordance with one aspect of the invention, a portion of reflecting planes 23₁ and 23₂ is utilized for the oblique angle at which the test image is projected. This portion is the area 45 of the plane 23₂. FIGS. 3a and 3b, which have a vertical plate 43 show that the light is projected along the optical axis 24, which extends at an oblique angle up to the right with respect to the optical axis 7.

FIG. 3a shows that in the test image projector 21 an infrared filter 46, an opal glass plate 47, and a glass plate 48 for color temperature correction of the lamp 27 are arranged between the lamp 27 and the test image slide 25. The infrared filter 46 has a lower infrared cut-off frequency than has the plate 43.

What is claimed is:

1. A color television camera comprising:
    a plurality of pickup elements, each pickup element having a pickup area with an optical axis, each pickup element generating an electrical image signal corresponding to an optical image incident on its pickup area;
    an optical color separation system for receiving light from a scene and for directing an image of the scene to each of the pickup areas, each scene image having an optical axis which corresponds to the optical axis of the pickup area to which the scene image is directed;
    a test image projector for projecting a test image onto each of the pickup areas via the color separation system; and
    an adjusting circuit for synchronizing the image signals generated by the pickup elements when the test images are projected onto the pickup areas; characterized in that:
    the test images are projected onto the pickup areas at oblique angles of incidence with respect to the optical axes of the corresponding scene images; and
    the camera further comprises precompensation means for correcting for imaging errors caused by the oblique angles of incidence of the test images.

2. A color television camera as claimed in claim 1, characterized in that the camera frtuher comprises a reflecting plane arranged outside a path over which the color separation system receives light from the scene, said reflecting plane receiving light from the test image projector along an optical axis of the test image projector and reflecting the light from the test image projector into the color separation system along a path which is obliquely arranged relative to the path over which the color separation system receives light from the scene.

3. A color television camera as claimed in claim 2, characterized in that:
    the test image projector comprises a slide of the test image; and
    the precompensation means comprises means for arranging the slide at an oblique angle with respect to the optical axis of the test image projector.

4. A color television camera as claimed in claim 3, characterized in that the precompensation means further comprises a cylindrical plano-convex correction lens arranged in the test image projector.

5. A color television camera as claimed in claim 4, characterized in that the precompensation means further comprises memory circuits in the adjusting circuit.

6. A color television camera as claimed in claim 5, characterized in that the camera further comprises:
    means for electronically scanning the pickup areas; and
    memory circuits for adjusting the scanning means.

7. A color television camera as claimed in claim 6, characterized in that each of the memory circuits comprises an adjustable, DC-voltage-supplied potentiometer.

8. A color television camera as claimed in claim 7, characterized in that the memory circuits in the adjusting circuit can be switched off.

9. A color television camera as claimd in claim 6, characterized in that each of the memory circuits comprises an adjustable, DC-voltage-supplied potentiometer.

10. A color television camera as claimed in claim 1, characterized in that:
    the test image projector comprises a slide of the test image; and
    the precompensation means comprises means for arranging the slide at an oblique angle with respect to an optical axis of the test image projector.

11. A color television camera as claimed in claim 10, characterized in that the precompensation means further comprises a cylindrical plano-convex correction lens arranged in the test image projector.

12. A color television camera as claimed in claim 1, characterized in that the precompensation means comprises a cylindrical plano-convex correction lens arranged in the test image projector.

13. A color television camera as claimed in claim 1, characterized in that the precompensation means comprises memory circuits in the adjusting circuit.

14. A color television camera as claimed in claim 13, characterized in that the camera further comprises:
   means for electronically scanning the pickup areas; and
   memory circuits for adjusting the scanning means.

15. A color television camera as claimed in claim 14, characterized in that each of the memory circuits comprises an adjustable, DC-voltage-supplied potentiometer.

16. A color television camera as claimed in claim 13, characterized in that each of the memory circuits comprises an adjustable, DC-voltage-supplied potentiometer.

17. A color television camera as claimed in claim 13, characterized in that the precompensation means can be switched off.

* * * * *